(12) United States Patent
Hickman

(10) Patent No.: US 6,372,289 B1
(45) Date of Patent: Apr. 16, 2002

(54) PROCESS FOR MANUFACTURING ACTIVATED CARBON HONEYCOMB STRUCTURES

(75) Inventor: David L. Hickman, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/466,318

(22) Filed: Dec. 17, 1999

(51) Int. Cl.[7] .................................... B05D 3/02
(52) U.S. Cl. ................... 427/228; 427/235; 428/116; 428/117; 502/527.19
(58) Field of Search .............. 502/527.19, 418, 502/60, 80, 85; 427/228, 235; 428/116, 117, 118

(56) References Cited

U.S. PATENT DOCUMENTS

| | | | |
|---|---|---|---|
| 3,922,412 A | * 11/1975 | Yoshikawa et al. | |
| 4,420,316 A | * 12/1983 | Frost et al. | |
| 5,451,444 A | 9/1995 | DeLiso et al. | |
| 5,487,917 A | * 1/1996 | Gadkaree | |
| 5,488,021 A | 1/1996 | DeLiso et al. | |
| 5,510,063 A | 4/1996 | Gadkaree et al. | |
| 5,628,819 A | * 5/1997 | Mestemaker et al. | |
| 5,658,372 A | 8/1997 | Gadkaree | |
| 5,750,026 A | 5/1998 | Gadkaree et al. | |
| 5,820,967 A | 10/1998 | Gadkaree | |
| 6,097,011 A | * 8/2000 | Gadkaree et al. | |
| 6,156,997 A | * 12/2000 | Gadkaree | |
| 6,248,691 B1 | * 6/2001 | Gadkaree et al. | |

* cited by examiner

Primary Examiner—Deborah Jones
Assistant Examiner—Wendy Boss
(74) Attorney, Agent, or Firm—Kees van der Sterre

(57) ABSTRACT

A process for making a honeycomb article having longitudinal channels extending from one face to a second face supporting a uniform coating of activated carbon on the channel walls, the process comprising the step of providing a solid heat-activated oxidant within the channels and heating the article to release the oxidant and uniformly activate the carbon coating.

25 Claims, 4 Drawing Sheets

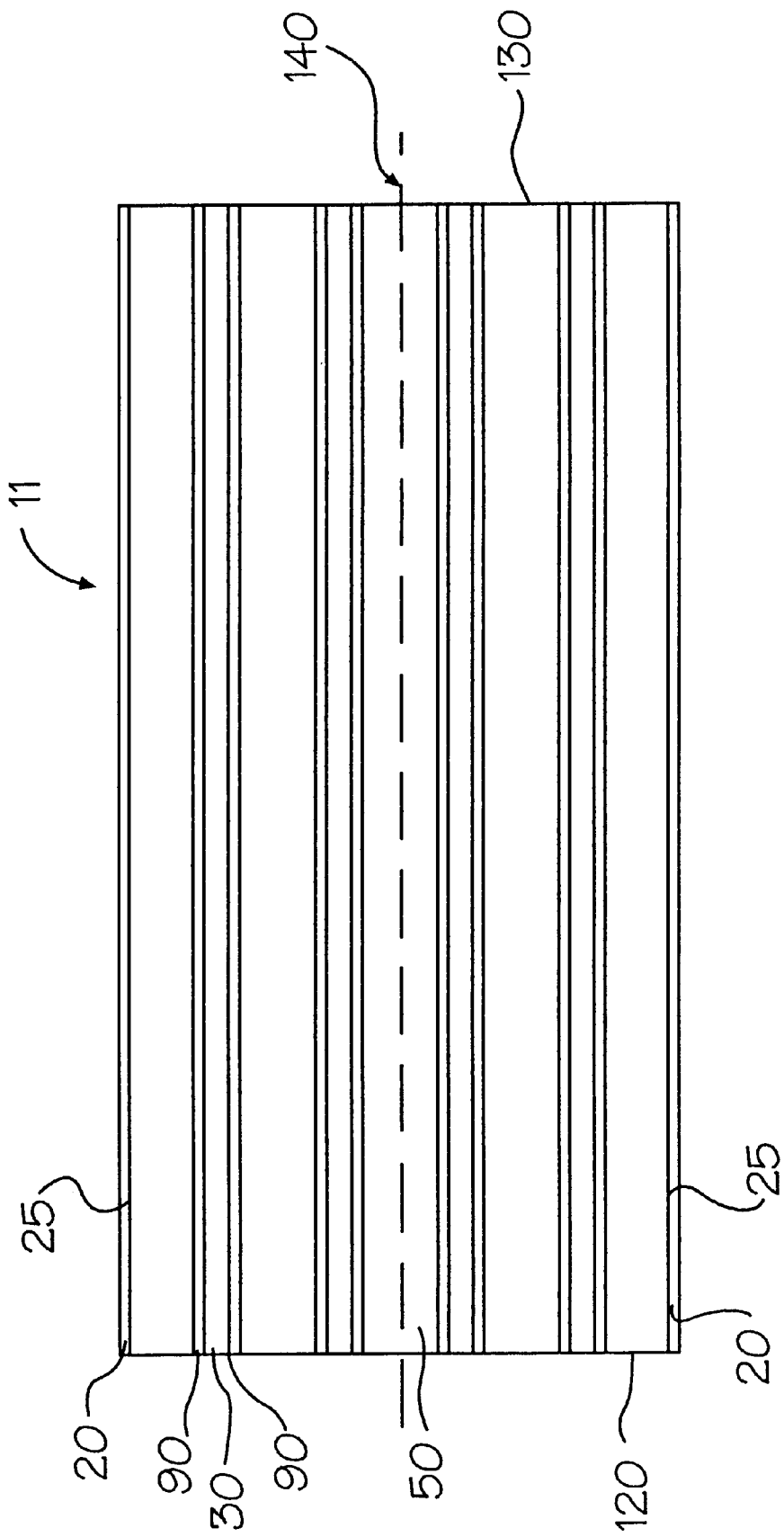

PROCESS FOR MANUFACTURING ACTIVATED CARBON HONEYCOMB STRUCTURES

FILED OF THE INVENTION

The present invention relates to substrates coated with activated carbon useful for filtering impurities from fluid workstreams and, more specifically, to a method for uniformly activating carbon that resides on the walls of a honeycomb structure.

DESCRIPTION OF PRIOR ART

Activated carbon is a nongraphitic, microcrystalline form of carbon which has been processed to produce high porosity. Activated carbon is characterized by a high specific surface area (e.g., 300 to 2500 $m^2/g$) and is known for its high adsorptive capability. The pores formed in the activated carbon may be macropores (i.e., pores having a diameter greater than about 500 angstroms), mesopores (i.e., pores having a diameter between about 20 and 500 angstroms), or micropores (i.e., pores having a diameter less than about 20 angstroms).

Activated carbon enjoys widespread use in the removal of impurities from fluid (i.e., liquid or gas) streams. For example, impurities in foods, fruit juices, and alcoholic beverages or medicinals (e.g., insulin, vitamins) can be successfully filtered using activated carbon. Likewise, activated carbon is useful in the removal of gaseous species present in low concentrations in air or gas streams such as gas separation processes, processes for removal of organic vapors, or in cigarette filters. Activated carbon has particular utility in adsorbing and purifying fluid emissions or workstreams from internal combustion engines.

Conventionally, activated carbon is used in a powdered or granular form. Powdered or granular activated carbon is inconvenient to use in processes where continuous workstream flows of fluids are filtered and/or treated. This is especially true for liquid fluids where tightly packed carbon beds cause significant pressure drop and pumps are required in order to maintain sufficient flow. To solve this problem, attempts have been made to use activated carbon in the form of, or in conjunction with, a solid substrate. For example, attempts have been made to manufacture monolithic substrates consisting essentially of activated carbon or to extrude carbonaceous material as a substrate and then convert the entire substrate to activated carbon. In such processes, a binder is typically added to the activated carbon powder and the mixture is extruded as a monolithic substrate. See, for example, U.S. Pat. Nos. 5,043,310 to Takeuchi, et al., 4,999,330 to Bose, et al., 4,399,052 to Sugino, and 4,386,947 to Mizuno, et al.

Substrates formed by these methods have limited utility. For example, the binder used to facilitate extrusion can block the pores of the activated carbon and, therefore, diminish the adsorption capability of the substrate. If the amount of binder is reduced to minimize blocking, the strength of the substrate is unacceptably reduced. Furthermore, most substances useful as extrusion binders begin to deteriorate at temperatures above 150° C., further diminishing their applicability. Lastly, components of the process stream being filtered often react with commonly used extrusion binders, causing the binder to deteriorate during use. For example, water present in a fluid stream will dissolve methylcellulose, a very commonly used extrusion binder.

U.S. Pat. No. 4,518,704 to Okabayashi, et al. describes a method for making an activated carbon substrate using an inorganic binder (e.g., clay, talc, alumina, fusible glass powder). The high percentage of binder particles required to achieve acceptable strength in the honeycomb, however, results in low adsorptive capability. Furthermore, the strength of the formed substrate remains low due to the poor bonding of the carbon to the inorganic binders.

Other, equally unsatisfactory attempts to form carbon substrates feature coating a substrate with a slurry of carbon in a binder. See U.S. Pat. Nos. 4,992,319 to Kurosawa, et al. and 5,104,540 to Day, et al. The requisite binder in the carbon coating results in substrates with poor adsorptive capability due to the binder particles closing off some of the porosity in the activated carbon. Furthermore, the activated carbon is prone to flaking or chipping off of the substrate due to the weak bonds among the binder, the carbon, and the substrate.

Another problem that plagues the prior art designs for activated carbon honeycomb is the inability to uniformly activate the carbon channels. This is a significant problem when the honeycomb article has channels that are longer than the diameter of the individual channels. In these cases the gaseous oxidant is consumed prior to reaching the full length of the channels. Currently, the only way to address this problem is to increase reaction times and decrease the activation temperature This, however, is highly undesirable. Furthermore, even this approach will not work for honeycomb articles that have sealed or plugged ends.

Therefore it would be highly desirable to provide a honeycomb article for filtration or purification of workstreams that would have the following properties: a) excellent structural integrity, b) a low pressure drop through the filtration element, c) easy to manufacture at low cost, and d) uniformly high activity of the carbonaceous layer.

To achieve these desirable characteristics a process is required that allows for a rapid carbon-activating step that assures uniformity of activation.

SUMMARY OF THE INVENTION

In accordance with the desire to provide a structurally strong honeycomb article having a carbon filtration/purification element of uniform activity and a low pressure drop for process workstreams, the following process has been discovered. It is useful with substantially any honeycomb structure wherein the interior walls of the structure are composed of or incorporate a coating of carbon requiring uniform activation.

Briefly, the process utilized in accordance with the invention involves heating the honeycomb to release a carbon-activating material from a heat-activated source of carbon-activating material provided within the channels of the honeycomb. The heat-activated source material may be provided, for example, in intimate mixture with the thermosetting resin, and/or it may be introduced by filling the hollow regions of the honeycomb with carbon-activating material before or after converting the resin to carbon. The carbon-activating material is generally a material that, on heating, produces an oxidizing environment for the carbon layer, creating high-porosity activated carbon which uniformly resides on the walls of the honeycomb structure.

DESCRIPTION OF THE DRAWINGS

A complete understanding of the present invention may be obtained by reference to the accompanying drawings, when considered in conjunction with the subsequent, detailed description, in which:

FIG. 5 is a schematic diagram of a longitudinal axis cross section of the honeycomb article depicted in FIG. 4.

DETAILED DESCRIPTION

The precursor starting material for the present invention typically comprises a honeycomb article whose walls comprise an essentially continuous carbonaceous layer. Different embodiments of such articles are described in detail in commonly assigned U.S. Pat. Nos. 5,451,444 and 5,488,021 to DeLiso et al., 5,510,063 to Gadkaree et al., 5,658,372 to Gadkaree, 5,750,026 to Gadkaree et al., and 5,820,967 to Gadkaree. All of these references are hereby incorporated by reference in toto. The honeycomb embodiments and their processes of manufacture disclosed in these references are generally useful in the current invention. The inventive process of generating activated carbon in a honeycomb structure represents a significant advancement in this technology.

Figure 1:
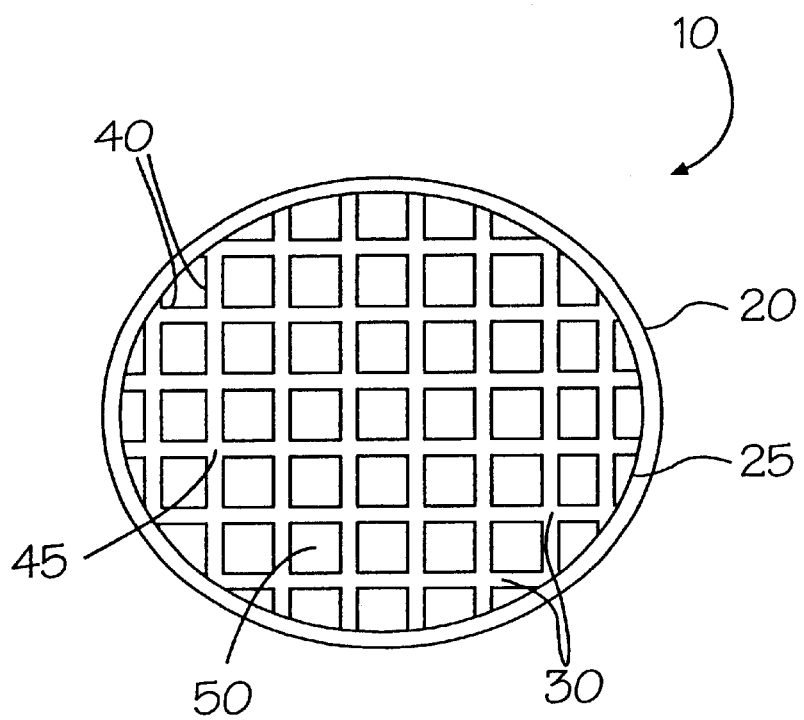
FIG. 1 is a schematic diagram of a cross section of a honeycomb substrate used in one embodiment of the present invention and having all channels open.
Figure 2:
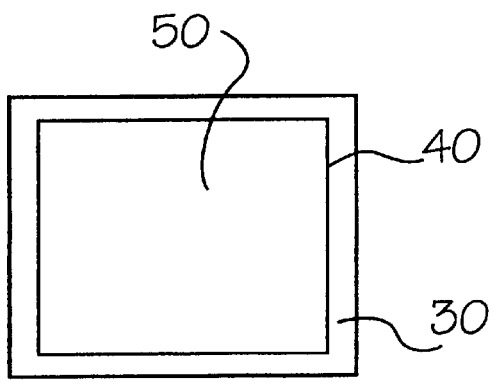
FIG. 2 is a schematic diagram of the cross section of a single cell within the honeycomb depicted in FIG. 1.

The honeycomb substrates as used in the present invention are defined by a combination of features common to all of the embodiments of the invention. Referring variously to FIGS. 1–4 of the drawings, the substrates 10 include: a) an exterior wall 20, b) a plurality of individual walls 30 affixed to the inside surface 25 of the exterior wall 20, formed so that they intersect each other inside the enclosed space of the exterior wall 20 to form a plurality of honeycomb cells defined by two adjacent horizontal walls and two adjacent vertical walls and their respective mutual intersections 45, and c) a plurality of channels 50 defined by the hollow space within the honeycomb cells and abutting the interior surfaces 40 of the horizontal and vertical cell walls 30. FIGS. 1 and 2 depict a full honeycomb substrate of this design and an individual substrate cell respectively.

In various embodiments, the honeycomb article or structure in the present invention can be made from various materials depending on end use and the conditions of that end use for the honeycomb article. The honeycomb article may be an integral or composite material. In either case, it must have channel walls whose surfaces comprise activated carbon.

If the honeycomb is an integral article, it may suitably be formed, for example of a crosslinkable thermosetting resin material such as a phenol formaldehyde copolymer, the copolymer optionally containing an inorganic powder filler such as cordierite. The copolymer with or without the filler is directly formed into the shape of a honeycomb article. After fabrication, the article is cured at an elevated temperature to cure and set the resin, and subsequently further heat-treated under conditions suitable for converting the thermosetting composition into a carbonaceous material.

For the sake of clarity, the term carbonaceous is defined herein as a material that is composed primarily of carbon, all other constituents being present in only minor proportions. The procedure described generates a honeycomb article that is essentially uniform in composition, composed either of all carbon or of carbon incorporating a uniform dispersion of the powder filler. The carbonaceous honeycomb requires heat treatment to activate the carbon on the surface of the channel walls, this typically involving developing an oxidizing environment within the channels at an elevated temperatures as described in more detail below.

Another embodiment of the present invention employs a composite honeycomb structure wherein a honeycomb precursor substrate is formed of metals or inorganic materials such as ceramics or glass. After forming, the channel walls are coated with a carbonaceous or carbon precursor resin material. As in the process of the first embodiment, the resin is cured and then carbonized to form an essentially uninterrupted layer of carbonaceous material. In this embodiment the carbonaceous surface layer is normally essentially free of fillers or other potential diluents. Potential additional benefits of the second embodiment compared to the first embodiment include greater surface area for the carbon surface in some cases, since the precursor substrate may be porous and impart substantial porosity to the carbonaceous layer. In those cases activation and ultimate use of the carbon as a adsorptive material is more efficacious.

Because this latter embodiment above is a composite, the structural integrity can be enhanced by judicious choice of the underlying honeycomb substrate. Some inorganic materials for honeycomb construction that are especially suited to the practice of the present invention, are those made of cordierite, mullite, clay, talc, zircon, zirconia, zirconates, zirconia-spinel, zeolites, magnesium alumino-silicates, spinel, alumina, silica, silicates, borides, alumino-silicates (e.g., porcelains, lithium aluminosilicates, alumina silica, feldspar, titania, fused silica), nitrides (e.g. silicon nitride), borides, carbides (e.g., silicon carbide), or mixtures of these. Especially useful honeycomb materials are cordierite and/or mullite.

In a third embodiment, the honeycomb article is a bonded monolithic structure such as described in U.S. Pat. No. 5,488,021, comprising a body made of carbon particles bonded together with a clay binder such as attapulgite and/or sepiolite, and a plasticizing organic binder such as cellulosic ethers. The carbon particles in such structures are typically smaller than about one-half to one-third the thickness of the honeycomb cell wall after extrusion. In the present invention the carbon particles need not be activated as required in the '021 patent, but after honeycomb formation can be activated by use of the inventive process.

The honeycomb article could also be prepared as described in U.S. Pat. No. 5,510,063. The method of that patent involves combining and shaping fugitive channel-forming elements and a crosslinkable resin into a green body and curing the resin. The temperature at which the channel-forming elements begin to distort is greater than the curing temperature of the resin. The resin is carbonized while the channel-forming elements are vaporized out to form a carbon body having flow through channels in the configuration of the fugitive elements. The channels in the carbon body may then be activated by the current inventive process.

As previously noted, particularly high wall porosity is attainable in composite honeycomb articles which are based on inorganic substrates having an outer surface from which pores extend into the substrate. Such articles are more fully described in U.S. Pat. No. 5,451,444. When the uncoated honeycomb is a ceramic it is typically prepared by extrusion and is used after sintering. Glass can also be used to form the honeycomb article. In this case an optional redrawing step can be included after the green material is extruded but before sintering has been performed.

With any of the above described embodiments, it is preferred that the honeycomb substrate comprise a matrix of thin porous walls which form a multiplicity of cells or channels extending between the first and second ends of the honeycomb. Some examples of the honeycombs produced by the process of the present invention, although it is understood that the invention is not limited to these, are those having about 172 cells/cm$^2$ to about 1.5 cells/cm$^2$. Wall thicknesses range typically from about 0.1 to about 1.3 mm for most applications.

Referring to FIG. 5 of the drawing, in one embodiment of the present invention, the honeycomb article 11 is linear and has inlet 120 and outlet faces 130 diametrically opposed; alternatively it is within the scope of the invention that the honeycomb article can be bent along its main axis 140 to form a curved object, not shown. Furthermore, the honeycomb substrate can be twisted around its main axis to form helical pathways for the channels 50. There is also no limitation on the size of the inlet face 120 compared to the outlet face 130. If the faces are not of the same size, the honeycomb article can either be uniformly increasing in size from one face to the next or have one flared end. Any or all of these configurations can be combined to yield an article appropriately configured for any specific application.

Referring in more detail to a preferred procedure for providing a composite activated carbon-containing honeycomb in accordance with the invention, a porous inorganic honeycomb structure of glass or ceramic composition is first contacted with a coating and impregnating substance consisting essentially or wholly of a carbon precursor liquid to form a coated cell. Carbon precursors useful in the present method include any liquid or liquefiable carbonaceous substance. Examples of useful carbon precursors 60 include thermoplastic resins (e.g., polyvinylidene chloride, polyvinyl chloride, polyvinyl alcohol, and the like), thermoset resins (e.g., epoxies, phenolic resins, polyesters, polyimides, and the like), sugar solutions, furfuryl alcohol, and coal tar pitch.

Contacting can be accomplished by any method suitable to bring the carbon precursor solution in intimate contact with the inorganic substrate. Exemplary methods of contacting include dipping the substrate in the precursor solution or spraying the precursor solution directly on the substrate. Low viscosity carbon precursors (e.g., thermoset resins) are preferred because their low viscosity allows greater penetration of the carbon precursor into porous, inorganic substrates. Phenolic resins are most preferred due to their low viscosity, high carbon yield, high degree of cross-linking upon curing relative to other precursors, and low cost.

The carbon precursor liquid used in the present method can include a single precursor material or a mixture of two or more precursor materials. Optionally, activated carbon can be added to the carbon precursor liquid to increase the adsorptive capability of the formed composite.

The eventual quantity of carbon formed on the composite is dependent on the amount of carbon precursor retained by the inorganic substrate. The amount of carbon precursor retained by the substrate can be increased, for example, by contacting the substrate with the precursor liquid more than once and allowing the substrate to dry between contacting steps. In addition, the amount of precursor retained by the substrate can be controlled in porous substrates simply by modifying the overall porosity of the substrate. Increasing porosity increases the amount of precursor retained by the porous substrate and, in turn, the amount of carbon formed.

After the contacting step, the inorganic substrate is treated under conditions effective to cure (i.e., solidify) the carbon precursor on and within the inorganic substrate, thus to provide cells with a cured resin coating disposed thereon. Curing is typically accomplished by heating the coated inorganic substrate to temperatures in the range of about 100° C. to 200° C. for about 0.5 to 5.0 hours. Curing is generally performed in air at atmospheric pressure. When using certain precursors (e.g., furfuryl alcohol) curing can be accomplished by adding an acid catalyst at room temperature. Examples of acid catalysts can be found in U.S. Pat. No. 5,750,026.

Following curing, the honeycomb structure must be heated under conditions effective to convert substantially all of the cured carbon precursor to carbon. Essentially, carbonization is the thermal decomposition of the carbon precursor or organic resin material, thereby eliminating low temperature species (e.g., carbon dioxide, water, etc.) and producing a fixed carbon mass having a rudimentary pore structure. Such conversion or carbonization of the cured carbon precursor is typically accomplished by heating the substrate to a temperature in the range of 600° C. to 1000° C. for about 1 to 10 hours in a reducing or inert atmosphere (e.g., nitrogen, argon).

Curing and carbonizing the carbon precursor on the substrate results in a composite with a coating extending over the outer surface of the substrate in the form of a substantially uninterrupted layer of carbon. This method provides composites which contain carbon in an amount less than and up to about 50 percent, often less than and up to about 30 percent, of the total weight of the composite.

In general, the methodology for the activation of the carbonaceous layer in accordance with the invention involves controlled partial carbon oxidation. Oxidative species are believed to react with high energy sites in the non-graphitic carbon sheets to generate the different size pores. Activated carbon is characterized by a high specific surface area (e.g., 300 to 2500 m$^2$/g) and is known for its high adsorptive capability.

Typically, prior art processes utilize a gaseous or vaporous oxidizing agent which is blown through the channels of the honeycomb and which thereby come into contact with the carbonaceous layer. Unfortunately, the oxidant gas or vapor does not necessarily provide for uniform oxidation of the carbonaceous layer, especially when the aspect ratio of the honeycomb article (i.e., the length of the honeycomb channel versus the diameter of the honeycomb channels) is high. In the case of these formed objects, it is extremely difficult to contact the carbon surfaces in the interior of the object with the same atmosphere as is contacted by the exterior of the object.

As the oxidizing gas reacts with the carbon, the gas becomes inert and the concentration of reactants in the gas is not the same in the interior as it is at the exterior. The usual prior art approach to address this problem is to increase the activation time and decrease the activation temperature. If the rate of the reaction of the gas is slow and the diffusion of the gas reasonably rapid it is possible to increase the uniformity of the atmosphere at various portions of the formed object. However, it is never desirable from an economic standpoint to slow down a manufacturing process in order to obtain beneficial results that can be obtained without this tradeoff. This problem is further exacerbated if the ends of the honeycomb channels have been sealed or plugged, as described in U.S. Pat. No. 5,750,026.

To circumvent this problem, the present invention utilizes a solid pro-oxidant or carbon-activating material provided within the carbon-containing or carbon-coated honeycomb channels. One convenient method for introducing the carbon-activating material is simply to introduce the material in the form of a solid powder into the honeycomb channels through one of the faces of the honeycomb. Because it is important in this approach that the powder essentially uniformly fill the channel cavities, it is recommended that the honeycomb substrate be agitated or shaken to ensure that the pro-oxidant packs evenly within the channel.

In an alternative approach, the carbon-activating material can be added as part of the resin or carbon precursor material formulation instead of being added after the carbonaceous layer has been formed. In either case, however, the pro-oxidant is activated by subjecting the pro-oxidant/honeycomb combination to elevated temperatures. On heating, the solid pro-oxidant either reacts directly or forms gaseous oxidizing products that react with the surface of the carbonaceous layer to form pores, thereby activating the carbon.

The pro-oxidants of the present invention include materials that thermally dehydrate to liberate water or decompose to liberate other oxidizing species. Typically, these pro-oxidants or carbon-activating materials are inorganic salts comprising a metal oxide or complex anion containing oxygen and preferably contain water of hydration. Examples of such anions include nitrate, nitrite, hydroxide, silicate, bicarbonate, carbonate, sulfate, sulfite, phosphate, phosphite, permanganate, perhalate, halate, halite, hypohalite, and mixtures thereof.

The metal ions associated with the pro-oxidants can be most of the common metals as found in the Periodic Chart within the group selected from column $1a$, $2a$, $3b$, $4b$, $5b$, $6b$, $7b$, $8$, $1b$, $2b$, $3a$, $4a$, and, $5a$ with the orbits of K through O and the Lanthanides and mixtures thereof. In order to avoid confusion, the Periodic Chart and its columns and orbits are those published in the 45th Edition of the *Handbook of Chemistry and Physics*. Although useful in the present invention, cadmium, lead, and mercury are not preferred metals due to toxological and environmental hazards. Preferred metal ions include antimony, barium, bismuth, calcium, cerium, iron, lithium, magnesium, manganese, potassium, sodium, strontium, and mixtures thereof Preferred inorganic salts for the present invention include antimony nitrate, barium hydroxide octahydrate, barium nitrate, bismuth hypobromite, bismuth hypochlorite, calcium carbonate, cerium sulfate octahydrate, iron oxide hydrate, lithium hydroxide, lithium nitrate, magnesium hydroxide, magnesium carbonate, manganese nitrate tetrahydrate, potassium nitrate, sodium carbonate, and strontium hydroxide. A most preferred inorganic salt is barium hydroxide octahydrate.

Complex inorganic salts in the form of clay or minerals are also of use as pro-oxidants primarily for their ability to liberate water. Preferred hydrated minerals include clay and talc although clay may have too low a dehydration temperature. Therefore, it is preferably used when a two step carbonization/activation process is employed.

The process of heat treating the pro-oxidant or carbon activator can be performed over a rather wide range of temperatures and times. A useful temperature range is between 600° C. and 1400° C. and the preferred range is between 600° C. and 1000° C. The process time for activating the carbon at these elevated temperatures is dependent on several factors, such as specific temperature, the pro-oxidant used, and the desired pore size in the activated carbon. Because this is an oxidative process, excessive processing causes serious degradation of the carbon layer and is detrimental to the overall utility of the final honeycomb structure. However, when conditions are properly maintained, it is possible to achieve pore sizes that are significantly less than obtainable by other methods of activating carbon. Typical pore sizes range from about 10 Å to about 2000 Å. The activated carbon has a BET surface area of between 200 and 3000 $m^2/gm$.

As mentioned above, the pro-oxidants are decomposed to generate gaseous oxidants. Using the preferred inorganic salts, the common oxidants formed include free water, oxygen, carbon dioxide, nitrogen oxides and sulfur oxides. Remaining after the activation of carbon in the channels are residual inorganic solids. These residual materials may be removed prior to utilizing the carbon-activated honeycombs to process contaminant workstreams.

Removal of the residues can be performed by any process that does not inherently damage the honeycomb article. Useful techniques involve physical techniques such as shaking or vibrating the honeycomb article to dislodge the residue. It is also possible to forcibly draw an inert gas through the channels either by applying pressure or by drawing a vacuum. Likewise, it is possible to flush the residue out with a stream of liquid. Preferred inert gases include dry air, nitrogen, and carbon dioxide. Preferred liquids include deionized or distilled water.

Figure 3:
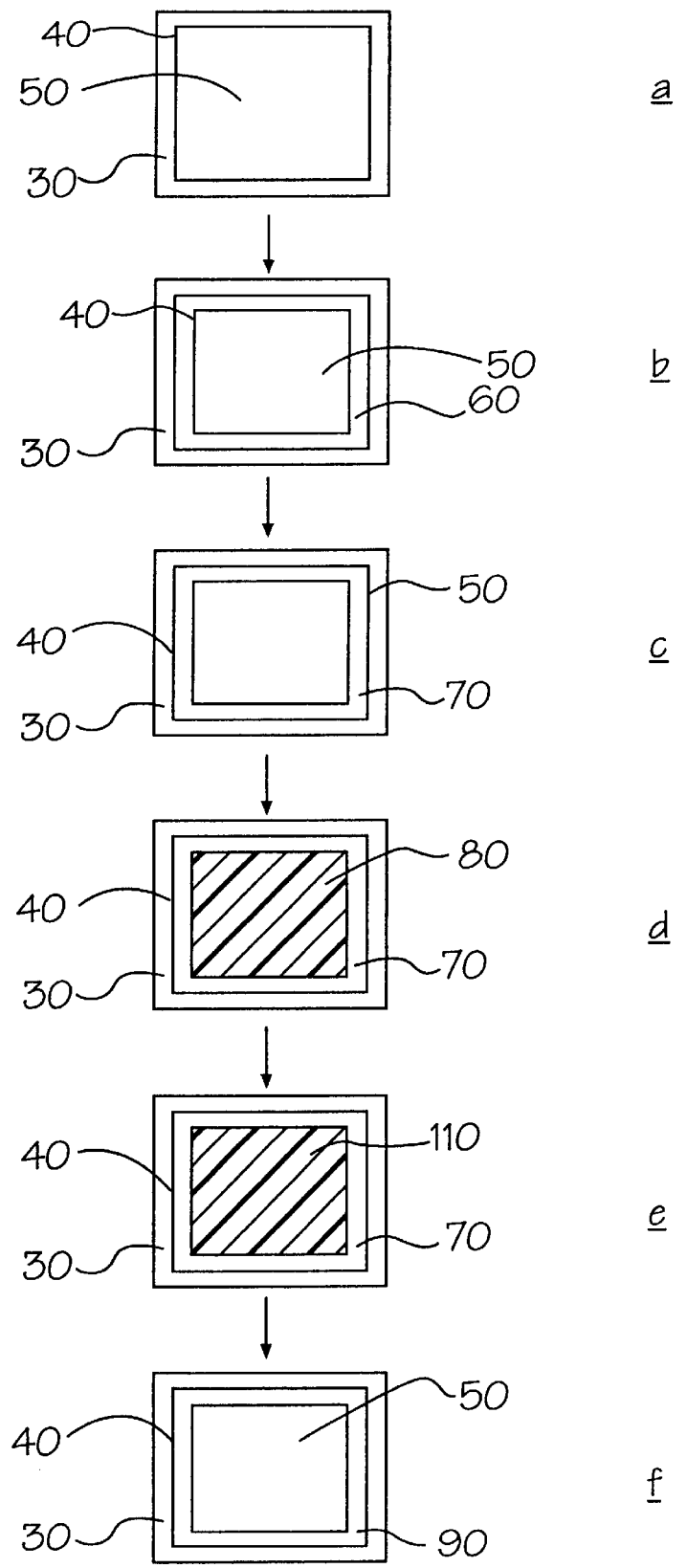
FIG. 3 is a schematic process flow of an embodiment of the present invention as depicted for the single cell of FIG. 2.

A schematic illustration of the application of this method for providing a composite activated carbon honeycomb in accordance with the invention is provided in FIG. 3, parts (a)–(f) of the drawing. Illustrated with reference to a single representative honeycomb channel 50, the specific method steps, identified by letters corresponding to the same specific parts of the drawing, are as follows:

a) forming a honeycomb substrate comprising a plurality of channels 50 separated from one another by channel walls 30, the channels 50 extending longitudinally through the honeycomb from an inlet face to an outlet face thereof, b) covering the channel walls 30 with a layer of a carbon precursor 60, c) heating the precursor 60 to form a carbon layer 70, d) providing a heat-activated carbon-activating material 80 within the channels 50, the carbon-activating material 80 having a composition effective to release an oxidizing substance from the carbon-activated material;

e) heating the honeycomb to a temperature at least sufficient to produce activated material 110 which releases the oxidizing substance (not shown) to react with the carbon layer 70 on the honeycomb cell walls 30 to activate the carbon; and f) removing residual activated material 110 from the cell channels 50 to expose the coating of activated carbon 90.

Figure 4:
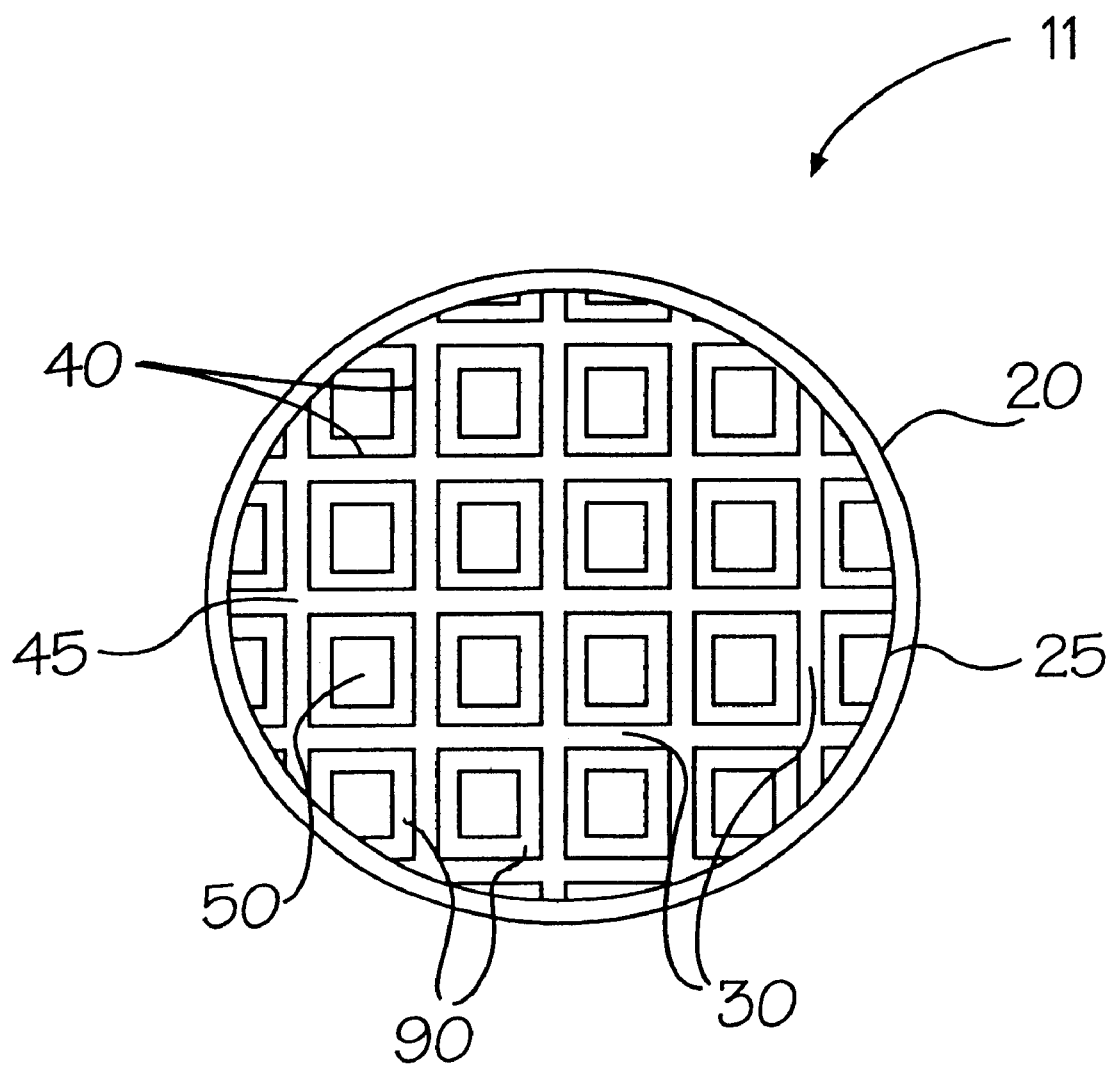
FIG. 4 is a schematic diagram of an end face of a final carbon-activated honeycomb article, having all channels open, in another embodiment of the present invention.

A final honeycomb article 11 is depicted in FIGS. 4 and 5 of the drawing. A key feature of that article is that that the channel walls 30 are covered essentially uniformly by activated carbon 90.

Where it is desired to incorporate the activating material directly into the carbon precursor coating in accordance with the invention, a particularly useful activating material is talc. Illustrative of the manner of use of this material, a mixture of talc at 65 wt % and a phenol formaldehyde carbon precursor resin at 35 wt % is first applied to the channel walls of a honeycomb article. The coated structure is then heated to 150° C. for 70 minutes to cure and carbonize the resin, and thereafter is heated to approximately 900° C. in order to dehydrate the talc. The water that is driven off is sufficient to activate the carbon layer uniformly.

It will be apparent from the foregoing description that many modifications and changes varied to fit particular operating requirements and environments may be resorted to in the practice of the invention by those skilled in the art. Therefore the invention is not considered to be limited to the specific examples chosen above for purposes of illustration, but rather covers all changes and modifications which do not constitute departures from the true spirit and scope of the invention as set out in the appended claims.

What is claimed is:

1. A method for making an activated-carbon-containing honeycomb structure comprising the steps of:

forming a honeycomb substrate having an inlet face and an oppositely disposed outlet face, and comprising a plurality of channels separated from one another by channel walls, said channels extending longitudinally through said honeycomb substrate from said inlet face to said outlet face;

covering said channel walls with a layer of carbon or carbon precursor;

providing a solid heat-activated carbon-activating material within said channels, said carbon-activating material releasing an oxidizing substance upon heating;

converting said carbon precursor to carbon; and heating said honeycomb substrate to a temperature at least sufficient to release said oxidizing substance, and reacting said oxidizing substance with said carbon to form activated carbon.

2. The method for making an activated-carbon-containing honeycomb structure as recited in claim 1 wherein the heat-activated carbon-activating material is provided in admixture with the carbon or carbon precursor layer on the channel walls.

3. The method for making an activated-carbon-containing honeycomb structure as recited in claim 1, wherein said converting step is performed prior to providing said heat-activated carbon-activating material within said channels.

4. The method for making an activated-carbon-containing honeycomb structure as recited in claim 1, further comprising removing residual solids from said channels.

5. The method for making an activated-carbon-containing honeycomb structure as recited in claim 4, wherein said removal process is selected from the group consisting of shaking or vibrating said honeycomb structure, blowing a gas through said honeycomb channels, and applying a vacuum to said honeycomb channels.

6. The method for making an activated-carbon-containing honeycomb structure as recited in claim 1, wherein said carbon or carbon precursor is essentially a uniform and uninterrupted layer.

7. The method for making an activated-carbon-containing honeycomb structure as recited in claim 1, wherein said carbon or carbon precursor comprises discrete particles.

8. The method for making an activated-carbon-containing honeycomb structure as recited in claim 1, wherein said heat-activated carbon-activating material thermally generates a gaseous oxidizing substance.

9. The method for making an activated-carbon-containing honeycomb structure as recited in claim 8, wherein said gaseous oxidizing substance comprises one of the group of free water, oxygen, carbon dioxide, nitrogen oxides, sulfur oxides, and peroxides.

10. The method for making an activated-carbon-containing honeycomb structure as recited in claim 1, wherein said carbon-activating material comprises an inorganic salt comprising a metal oxide or complex anion containing oxygen.

11. The method for making an activated-carbon-containing honeycomb structure as recited in claim 10, wherein said complex anion is selected from the group consisting of nitrate, nitrite, hydroxide, silicate, bicarbonate, carbonate, sulfate, sulfite, phosphate, phosphite, perhalate, halate, halite, hypohalite and mixtures thereof.

12. The method for making an activated-carbon-containing honeycomb structure as recited in claim 10, wherein said metal is an element found in the Periodic Chart within the group selected from column $1a, 2a, 3b, 4b, 5b, 6b, 7b, 8, 1b, 2b, 3a, 4a,$ and $5a$ from the period of 1 through 6 and the Lanthanides and mixtures thereof.

13. The method for mag an activated-carbon-containing honeycomb structure as recited in claim 12, wherein said metal is selected from the group of antimony, barium, bismuth, calcium, cerium, iron, lithium, magnesium, manganese, potassium, sodium, and strontium and mixtures thereof.

14. The method for making an activated-carbon-containing honeycomb structure as recited in claim 10, wherein said inorganic salt comprises the salts selected from the group of antimony nitrate, barium hydroxide octahydrate, barium nitrate, bismuth hypobromite, bismuth hypochlorite, calcium carbonate, cerium sulfate octahydrate, iron oxide hydrate, lithium hydroxide, lithium nitrate, magnesium hydroxide, magnesium carbonate, manganese nitrate tetrahydrate, potassium nitrate, sodium carbonate, and strontium hydroxide.

15. The method for making an activated-carbon-containing honeycomb structure as recited in claim 10, wherein said inorganic salt comprises barium hydroxide octahydrate.

16. The method for making an activated-carbon-containing honeycomb structure as recited in claim 10, wherein said inorganic salt comprises a hydrated mineral.

17. The method for making an activated-carbon-containing honeycomb structure as recited in claim 16, wherein said hydrated mineral comprises hydrated clay or talc.

18. The method for making an activated-carbon-containing honeycomb structure as recited in claim 1, wherein said temperature to release said oxidizing substance is between about 600° C. and 1400° C.

19. The method for making an activated-carbon-containing honeycomb structure as recited in claim 1, wherein said activated carbon has pore size ranging from about 10 Å to about 2000 Å and a BET surface area of between 200 and 3000 $m^2/gm$.

20. The method for making an activated-carbon-containing honeycomb structure as recited in claim 1, wherein said carbon precursor comprises an organic resin.

21. The method for making an activated-carbon-containing honeycomb structure as recited in claim 20, wherein said organic resin comprises a thermosetting resin selected from the group of phenolic resole and furan resins.

22. The method for making an activated-carbon-containing honeycomb structure as recited in claim 1, wherein said honeycomb structure comprises a ceramic, glass or metal material.

23. The method for making an activated-carbon-containing honeycomb structure as recited in claim 1, wherein said walls are porous to fluids passing through said channels.

24. The method for making an activated-carbon-containing honeycomb structure as recited in claim 1, wherein a portion of said channels is plugged at said inlet face and a remaining portion of said channels is plugged at said outlet face.

25. A method for making an activated-carbon-containing honeycomb structure comprising the steps of:

forming a carbonaceous honeycomb substrate having an inlet face and an oppositely disposed outlet face, and comprising a plurality of channels separated from one another by channel walls, said channels extending longitudinally through said honeycomb substrate from said inlet face to said outlet face;

providing a solid heat-activated carbon-activating material within said channels, said carbon-activating material releasing an oxidizing substance upon heating;

heating said carbonaceous honeycomb substrate to a temperature at least sufficient to release said oxidizing substance, and and reacting said oxidizing substance with said carbonaceous honeycomb to form activated carbon.

* * * * *